United States Patent [19]

Kawamura et al.

[11] 4,046,582
[45] Sept. 6, 1977

[54] AIR-ENTRAINING WATER-REDUCING AGENTS FOR CEMENT COMPOSITION

[75] Inventors: Yuichi Kawamura; Goro Hirano; Makoto Nagai; Yasunobu Miura, all of Yokohama, Japan

[73] Assignee: Nitto Chemical Industry Co., Ltd., Tokyo, Japan

[21] Appl. No.: 677,187

[22] Filed: Apr. 15, 1976

Related U.S. Application Data

[63] Continuation of Ser. No. 483,330, June 26, 1976, abandoned.

[30] Foreign Application Priority Data

June 26, 1973 Japan .................................. 48-71331
Feb. 13, 1974 Japan .................................. 49-16828

[51] Int. Cl.$^2$ ............................................. C04B 15/02
[52] U.S. Cl. ......................................... 106/88; 106/90
[58] Field of Search ............................. 106/88, 90, 86

[56] References Cited

U.S. PATENT DOCUMENTS 3,782,983   1/1974   Komor .................................. 106/88

Primary Examiner—J. Poer
Attorney, Agent, or Firm—Sughrue, Rothwell, Mion, Zinn and Macpeak

[57] ABSTRACT

A cement composition comprising a cement and an air-entraining water-reducing agent for the cement, comprising as an active ingredient a higher secondary alcohol oxyalkylene sulfate of the following general formula

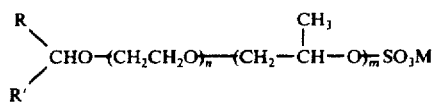

wherein R and R' are alkyl groups with the sum of the total number of carbon atoms of both R and R' being about 10 to 20; $n$ and $m$ are each an integer of from 0 to 15, with $n+m$ being 1 to 15, and M is an alkali metal atom, an ammonium group or an amine group.

7 Claims, 2 Drawing Figures

AIR-ENTRAINING WATER-REDUCING AGENTS FOR CEMENT COMPOSITION

This is a continuation of application Ser. No. 483,330, filed June 26, 1976, now abandoned.

BACKGROUND OF THE INVENTION

1. Field of the Invention

This invention relates to air-entraining water reducing agents for a cement composition suitable for addition to mortar and concrete, and, more specifically, to air-entraining water reducing agents for cement comprising a higher secondary alcohol oxyalkylene sulfate as an active ingredient.

2. Description of the Prior Art

Cement additives having air-entraining properties are used for improving the properties of mortar and concrete, and a variety of such additives are known. For example, salts of resin acid or modified products thereof, sulfated ester ammonium salts of higher primary alochols (or addition products thereof with ethylene oxide), alkylbenzenesulfonic acid salts, other synthetic detergents, salts of petroleum acids, fatty acids and proteinaceous substances, and organic salts of sulfonated hydrocarbons are known as air-entraining agents. Furthermore, ligninsulfonic acid salts or derivatives thereof, polynuclear aromatic sulfonic acid salts, polyalkylarylsulfonic acid salts such as sulfonated product of a condensate between creosote oil and formaldehyde, higher polyhydric alcohol salts such as polyoxyethylene alkyl ethers or polyol compounds, and hydroxycarboxylic acid salts are known as air-entraining water-reducing agents.

However, these air-entraining additives for cement are not entirely satisfactory with respect to the stability of the air bubbles in concrete, the effect of improving the workability of the concrete and the effect of reducing the amount of water required. For example, concrete containing the above-mentioned air-entraining agents or air-entraining water-reducing agents has poor water-entraining effect stability depending upon the temperature at which the concrete is mixed, or when fly ash or magnesium fluoro silicate is added to the concrete. Alternately, air bubbles in the concrete partly disappear at the time of transporting ready-mixed concrete in a concrete mixer truck, placing the concrete in the construction of skyscrapers, of dams or of the lining of tunnels, and transporting ready-mixed concrete by pumps. Consequently, this markedly reduces the workability of the concrete and results in a reduced operation efficiency. Furthermore, the disappearance of air bubbles results in the inability of the set concrete to attain the desired durability to freezing and thawing.

Another purpose of adding an air-entraining water-reducing agent to concrete is to disperse the cement particles in water at the time of mixing with a minimum amount of water being required, and to obtain the desired workability of the concrete, and further, to increase the strength of the cured concrete by an amount corresponding to the decrease in the unit amount of the water. Concretes containing the above-mentioned air-entraining water-reducing agents have fairly increased strengths initially as a result of the decrease in the unit amount of water, but their strengths at later stages are not entirely satisfactory and in some cases, the strengths are even lower than the strengths attainable without the addition of the air-entraining water-reducing agents.

In addition, the properties of concretes containing air-entraining agents, such as workability, setting time and strength, tend to be affected by the amounts of the additives, and the differences in chemical and physical properties of the cement and aggregate, and therefore, it is difficult to obtain concretes containing air-entraining agents and having stable properties.

SUMMARY OF THE INVENTION

It is an object of this invention to provide an air-entraining water-reducing agent which permits superior air bubble stability in the mortar and concrete in which it is used, and which has a water-reducing effect and an effect of increasing the strength of the hardened product with high stability.

After various investigations, it has been found that a sulfuric acid ester salt of a higher secondary alcohol adduct with ethylene oxide and/or propylene oxide has air-entraining water-reducing properties suitable for the object of this invention. This higher secondary alcohol oxyalkylene sulfate is a surface active agent which is not known as an air-entraining water-reducing agent for cement, and permits fine open cellular air bubbles to be distributed uniformly in the concrete with especially good air bubble stability. Also, it has a good dispersing action on cement particles and a great effect in reducing the amount of water required.

The higher secondary alcohol oxyalkylene sulfate exhibits much better water-reducing properties by using it conjointly with a resin acid salt than in the case of using it alone.

According to this invention, there is provided a cement composition comprising cement and an air-entraining water-reducing agent for the cement comprising as an active ingredient a higher secondary alcohol oxyalkylene sulfate having the following general formula

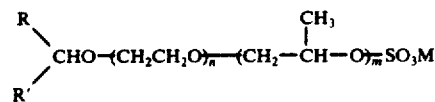

wherein R and R' are alkyl groups with the sum of the total number of carbon atoms of both R and R' being about 10 to 20; n and m are each an integer of from 0 to 15, with n+m being 1 to 15, and M is an alkali metal atom, an ammonium group or an amine group.

DETAILED DESCRIPTION OF THE INVENTION

Figure 1:
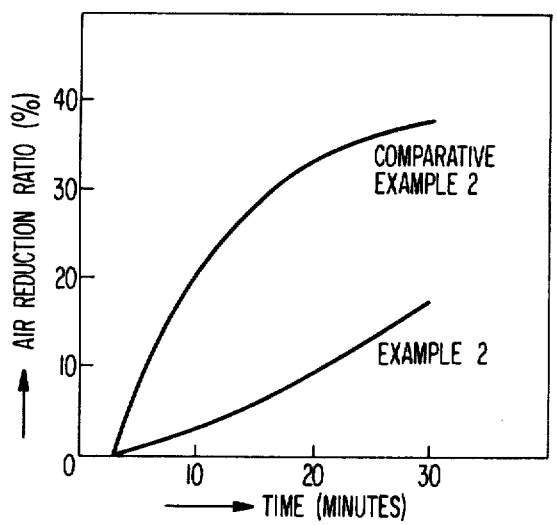
FIG. 1 shows the relationship between the air reduction ratio with the passage of time.

The higher secondary alcohol oxyalkylene sulfate expressed by the above general formula can be prepared by sulfating a polyoxyethylene alcohol ether or polyoxypropylene alcohol ether resulting from the addition of 1 to 15 mols of ethylene oxide or propylene oxide to 1 mol of a higher secondary alcohol containing about 10 to 20 carbon atoms or a polyoxyethylene-propylene alcohol ether having both propylene oxide and ethylene oxide added thereto, and neutralizing it with a basic substance. Suitable examples of higher secondary alcohols having a total of about 10 to 20 carbon atoms in the R and R' groups which can be employed in this invention are Tergitol 15 (tradename, produced by Union Carbide Co.; in which the main components are $C_{11}$ to $C_{15}$ compounds), Tergitol 45 (tradename, produced by Union Carbide Co.; in which the main components are $C_{14}$ and $C_{15}$ compounds), Softanol 24 (tradename, produced by Nippon Shokubai Kagaku Kogyo Co., Ltd.; in which the main components are $C_{12}$ to $C_{14}$ compounds) and the like. Examples of the salt produced are those of the below described basic substances such as the sodium, potassium, ammonium, a mono-, di- or tri-methylamine, or ethanol amine, etc., salt. Suitable examples of basic substances which can be employed to neutralize the sulfated reaction product are an alkali metal hydroxide such as sodium hydroxide, potassium hydroxide, etc., ammonium hydroxide, mono-, di- or tri-methylamine, mono-, di- or tri-ethanolamine, butylamine, propanolamine, and the like. Of these compounds, an alkali metal hydroxide, ammonium hydroxide, mono-, di- or tri-methylamine, and mono-, di- or tri-ethanolamine are more preferable in standpoints of economics. Mono-, di- or tri-methylamine, and mono-, di- or tri-ethanolamine are most preferred.

It has been recognized that the above higher secondary alcohol oxyalkylene sulfate has very good foaming property or foam stability in mortar or concrete, and unlike conventional air-entraining agents, does not impair the air-entraining effect in the co-presence of a third substance such as fly ash, calcium chloride, or magnesium fluoro silicate. Accordingly, the higher secondary alcohol oxyalkylene sulfate used in this invention in small amounts can impart moderate viscosity and fluidity to mortar or concrete to increase its plasticity and to reduce decreases in its workability with time.

After the mortar or concrete in which the air-entraining water-reducing agent of this invention is used has been set, the strength of the set mortar or concrete increases, and the effect of the increased strength can be maintained over a longer period of time than in the case of using conventional air-entraining water-reducing agents. Generally, cured cement products containing conventional air-entraining water-reducing agents or air-entraining agents exhibit higher strengths initially than where no such air-entraining agent is added, but as time passes, the strength frequently becomes equal to or lower than the strength of a crued cement product which does not contain such an air-entraining agent. In contrast, the strength of a cured cement product containing the higher secondary alcohol oxyalkylene sulfate in accordance with this invntion is higher than that of a cured cement product which does not contain a higher secondary alcohol oxyalkylene sulfate, even after long periods of time.

The amount of the higher secondary alcohol oxyalkylene sulfate added to cement can be varied according to the amount of air required, the types of cement and aggregate used, the compounding ratio of the components, etc., but generally, the higher secondary alcohol oxyalkylene sulfate is added in an amount of about 0.0003 to 0.02% by weight of the cement. When the amount is less than about 0.0003%, a sufficient water-reducing effect may not be obtained, and when the amount is above about 0.02%, the amount of entrained air becomes excessive and the strength sometimes becomes rather low. A suitable range for the production of ordinary concretes is about 0.0008 to 0.01% while for a light weight concrete a range of about 0.01 to 0.02% is suitable. A preferred range is about 0.0008 to 0.01%.

When the total number of the carbon atoms in the alkyl groups of R and R' in the above higher secondary alcohol oxyalkylene sulfate is less than about 10, the balance between oleophilicity and hydrophilicity tends to be poor, and this adversely affects the air bubble stability. If the total number of carbon atoms is larger than about 20, the water-solubility of the sulfate is reduced, and the effect of the sulfate per amount added tends to be decreased. Accordingly, the total number of the carbon atoms of the alkyl groups of R and R' in the sulfate should be from about 10 to 20. Furthermore, when the proportion of the oxyalkylene group in the above sulfate compound is larger than about 15 mols, the effect of the sulfate compound as an air-entraining water-reducing agent is reduced undesirably.

When the higher secondary alcohol oxyalkylene sulfate is used conjointly with a resin acid salt conventionally known as an air-entraining agent, a synergistic effect in the properties can be obtained. Specifically, mortar or concrete containing both the higher secondary alcohol oxyalkylene sulfate and the resin acid salt exhibits much the same air-entraining properties as mortar or concrete containing only the higher secondary alcohol oxyalkylene sulfate, and after setting, the strength further increases over the strength obtained using the above compounds individually. Furthermore, with small amounts of cement, a mortar or concrete having a high strength can be obtained.

The effect of compounding the higher secondary alcohol oxyalkylene sulfate and the resin acid salt can be produced when the proportion of the resin acid salt is about 1 to 5 parts by weight of the resin acid salt per part by weight of the higher secondary alcohol oxyalkylene sulfate. A suitable amount of the sulfate compound and the resin acid salt combined is about 0.0003 to 0.02% based on the weight of the cement. The resin acid salt is an alkali metal salt (for example, the sodium or potassium salt) of resin acid which mainly comprises diterpenic acid contained in a rosin or tall oil.

As described above, the air-entraining water-reducing agent of this invention imparts excellent air-entraining properties and water-reducing properties to mortar and concrete even when used in much smaller amounts than have hitherto been required, and permits the production of a cured cement product having high strength with a small amount of cement. This of course provides economic advantages, as well.

Suitable cement which can be employed in this invention is a hydraulic cement such as portland cement, blast furnace cement, alumina cement, silica cement, slag cement, Jet cement (regulated set cement), and a mixture thereof. Suitable cement compositions generally comprise about 34 to 67 wt% CaO, about 3 to 34 wt% $SiO_2$, about 4 to 51 wt% $Al_2O_3$, about 0 to 20 wt% $Fe_2O_3$ (containing FeO), about 0 to 6 wt% MgO and with an $SO_3$ content of about 0 to 11 wt%. An example of the concrete which can be produced, for example, is a concrete which can meet the requirements in JISA 5308 (ready-mixed concrete A series), but this invention is not limited to such and such is given for the purposes of illustration. Furthermore, a mortar which can be produced is a hydraulic cement mortar comprising portland cement, blast furnace cement or a mixture thereof, and this mortar can be utilized for lining of pipes by pumping method (cement: sand = 1:3 (by volume)) and for a joint-mortar (cement: sand = 1:1 — 2 (by volume)) for example.

When prior art air-entraining water-reducing agents are employed as described hereinbefore, the following necessary amounts must be used to meet the requirements, i.e., an air-content of 4% and a water-reduction coefficient of 10%. That is, it is well known that 0.25 wt% of Pozzolith-5L (lignin type; tradename, produced by Nisso Master Builders Co.), 0.25 wt% of KAO Mighty-150N (polyalkylarylsulfonic acid salt; tradename, produced by Kao Soap Co., Ltd.), or 0.25 wt% of Chupol-C (polyalkylaryl ether; tradename, produced by Takemoto Oil and Fats), based on the cement weight calculated on a solids basis, must be added using prior art techniques. However, with this invention, a much smaller amount of only 0.0003 to 0.02 wt% of the secondary alcohol oxyalkylene sulfate need be employed.

The properties and effects of the air-entraining water-reducing agents of this invention will be described in greater detail by reference to the following Examples. Unless otherwise indicated, all parts, percents, ratios and the like are by weight.

The water-reduction rate, compression strength rate, and amount of air, and the rate of decrease of slump value are defined as follows:

$$\text{Rate of Water Reduction (\%)} = \left(1 - \frac{\text{Unit amount of water in concrete containing the water-reducing agent}}{\text{Unit amount of water in concrete not containing the water-reducing agent}}\right) \times 100$$

$$\text{Rate of Compression Strength (\%)} = \frac{\text{Compression strength of concrete containing the water-reducing agent}}{\text{Compression strength of concrete not containing the water-reducing agent}} \times 100$$

$$\text{Rate of Decrease of the Amount of Air (\%)} = \left(1 - \frac{\text{Amount of air at given times}}{\text{Amount of air 3 minutes after the initiation of mixing}}\right) \times 100$$

$$\text{Rate of Decrease of the Slump Value (\%)} = \left(1 - \frac{\text{Slump value at given times}}{\text{Slump value 3 minutes after the initiation of mixing}}\right) \times 100$$

The measurement of the slump, the amount of air, the compression strength and the bleeding was made in accordance with Japanese Industrial Standards JIS A1101-1950, JIS A1128-1960, JIS A1108-1963, and JIS A1123-1957. The concrete samples used were formed in accordance with JIS A1132-1963.

EXAMPLE 1 AND COMPARATIVE EXAMPLE 1

A polyoxyethylene alcohol ether (tradename, Tergitol 15-S-3, Tergitol 15-S-9, Tergitol 15-S-12: Union Carbide Corporation) obtained by adding 3 to 12 mols on an average of ethylene oxide to a higher secondary alcohol mainly by 11 to 15 carbon atoms, a polyoxypropylene alcohol ether obtained by adding 2 mols on an average of propylene oxide, and an adduct of Tergitol 15-S-3 and 2 mols on an average of propylene oxide further added thereto were each sulfated, and then neutralized with a basic substance to form salts. The resulting salts were used as air-entraining water-reducing agents in Examples 1.1 to 1.6. On the other hand, a polyoxyethylene alcohol ether resulting from the addition of 3 mols on an average of ethylene oxide to a higher secondary alcohol mainly of 14 to 15 carbon atoms was sulfated, and neutralized to form a sodium salt (tradename, Unitol CS, Nippon Unitol Co., Ltd). The resulting salt was used as an air-entraining water-reducing agent in Example 1.7.

On the other hand, a sulfate of a higher secondary alcohol mainly of 14 to 15 carbon atoms, an ethoxy sulfate of a higher primary alcohol mainly of 11 to 15 carbon atoms, a sulfate of a higher primary alcohol mainly of 11 to 15 carbon atoms, a sodium alkylbenzenesulfonate, and commercially available sodium resinate (tradename, Vinsol, Yamaso Chemical Co., Ltd.) were used as air-entraining water-reducing agents in Comparative Examples 1.1 to 1.5.

Each of the air-entraining water-reducing agents in Examples 1.1 to 1.7 and Comparative Examples 1.1 to 1.5 was added to a comcrete mixing material of ordinary portland cement, fine aggregate (river sand, specific gravity 2.61) and coarse aggregate (river gravel, specific gravity 2.63, maximum size 25 mm) so that the amount of air in the concrete was 4 ± 1%. The concrete was mixed for 3 minutes with an Irich type mixer, and the amount of air was measured. At the same time, the fabrication and aging of samples for measuring compression strength were performed. The amount of air, the water reduction rate and the compression strength of each of the concretes are shown in Table 1.

Table 1

| Example (Ex.) or Comparative Example (Comp.) | Air-entraining Water-reducing Agent | Proportion of Air-entraining Water-reducing Agent (wt.%) | Concrete Formulation | | |
|---|---|---|---|---|---|
| | | | Cement (Kg/m$^3$) | Water (Kg/m$^3$) | Ratio of Fine Aggregate (%) |
| Ex. 1.1 | R\\CHO(CH$_2$CH$_2$O)$_3$SO$_3$Na /R' | 0.0011 | 300 | 159 | 35.5 |
| Ex. 1.2 | R\\CHO(CH$_2$CH$_2$O)$_3$SO$_3$TEA /R' | 0.0009 | " | 159 | " |
| Ex. 1.3 | R\\CHO(CH$_3$CHCH$_2$O)$_2$SO$_3$Na /R' | 0.0014 | " | 156 | " |
| Ex. 1.4 | R\\CHO(CH$_2$CH$_2$O)$_3$(CH$_3$CHCH$_2$O)$_2$SO$_3$Na /R' | 0.0012 | " | 155 | " |

Table 1-continued

| | | Amount | | |
|---|---|---|---|---|
| Ex. 1.5 | R\\CHO(CH$_2$CH$_2$O)$_6$SO$_3$Na /R' | 0.0011 | " | 157 | " |
| Ex. 1.6 | R\\CHO(CH$_2$CH$_2$O)$_{12}$SO$_3$Na /R' | 0.0014 | " | 156 | " |
| Ex. 1.7 | R\\CHO(CH$_2$CH$_2$O)$_3$SO$_3$Na /R' | 0.001 | " | 162 | " |
| Comp. 1.1 | R\\CHOSO$_3$Na /R' | 0.0015 | " | 162 | " |
| Comp. 1.2 | RO(CH$_2$CH$_2$O)$_3$SO$_3$Na | 0.0012 | " | 161 | " |
| Comp. 1.3 | ROSO$_3$Na | 0.0013 | " | 161 | " |
| Comp. 1.4 | C$_{12}$H$_{25}$—⌬—SO$_3$Na | 0.0019 | " | 157 | " |
| Comp. 1.5 | Sodium resinate | 0.006 | " | 163 | " |
| Reference | Not added | 0 | " | 173 | 36.4 |

| Example (Ex.) or Comparative Example (Comp.) | Amount of Entrapped Air (%) | Ratio of Water Reduction (%) | Slump (cm) | Compression Strength Ratio (%) | | | Bleeding Ratio (%) |
|---|---|---|---|---|---|---|---|
| | | | | 3 Days Old | 7 Days Old | 28 Days Old | |
| Ex. 1.1 | 4.3 | 9.1 | 7±1 | 122 | 112 | 107 | 1.45 |
| Ex. 1.2 | 4.2 | 8.9 | " | 124 | 114 | 108 | — |
| Ex. 1.3 | 4.3 | 10.0 | " | 136 | 124 | 118 | — |
| Ex. 1.4 | 4.4 | 10.4 | " | 127 | 120 | 114 | — |
| Ex. 1.5 | 4.0 | 9.2 | " | 123 | 118 | 110 | 1.50 |
| Ex. 1.6 | 4.5 | 9.9 | " | 122 | 116 | 109 | — |
| Ex. 1.7 | 4.4 | 6.9 | " | 122 | 111 | 105 | — |
| Comp. 1.1 | 4.2 | 6.2 | " | 127 | 107 | 100 | — |
| Comp. 1.2 | 4.5 | 7.0 | " | 116 | 103 | 99 | — |
| Comp. 1.3 | 4.3 | 6.7 | " | 117 | 104 | 99 | — |
| Comp. 1.4 | 4.5 | 9.3 | " | 117 | 107 | 96 | — |
| Comp. 1.5 | 4.5 | 5.6 | " | 102 | 101 | 98 | 2.02 |
| Reference | 1.8 | — | " | 100 | 100 | 100 | 3.15 |

Note 1:
R and R' represent alkyl groups, and the number of carbon atoms of both of R and R' was 10-14 in Examples 1.1 to 1.6, 13-14 in Example 1.7, 13-14 in Comparative Example 1.1, and 11-15 in Comparative Examples 1.2 to 1.3.
Note 2:
TEA in Example 1.2 stands for the triethanolamine salt.
Note 3:
The amount of the air-entraining water-reducing agent added was calculated on an anhydrous basis.

From the results shown in TABLE 1, the following can be seen.

RATE OF REDUCTION OF WATER

The air-entraining water-reducing agent of this invention even in a small amount gives rise to a high rate of reduction of water, and its foaming power is superior.

COMPRESSION STRENGTH

The strength of the concrete containing the conventional air-entraining agent or air-entraining water-reducing agent is high at an early stage when the development of the strength is rapid as a result of the decrease in the amount of water. But at later stages, the strength is not free from being lower than that of a concrete containing no air-entraining agent, as is generally considered. This tendency was also observed in the above Comparative Examples.

On the other hand, because of a high rate of reduction of water, the strengths of the concretes to which the air-entraining water-reducing agents of this invention had been added were found to be higher than that of a concrete containing no air-entraining agent not only at early stages but also at later stages. However, when the air-entraining water-reducing agent of this invention are used, the use of additional cement, which has been required previously to prevent a reduction in the strength of the concrete, is not needed, and this provides improved economic advantages.

BLEEDING

One object of adding the air-entraining water-reducing agent is to inhibit bleeding. Bleeding shows the degree of separation of concrete ingredients due to the difference in specific gravity after placement of the concrete. If bleeding is great, difficulties occur in the concrete placing operation, and the working efficiency is reduced. In addition, the characteristics of the concrete after setting are markedly deteriorated. The air-entraining water-reducing agents of this invention produce better results in reducing bleeding than conventional air-entraining agents, and contribute to the homogeneity of the concrete, thus providing a better quality.

EXAMPLE 2 AND COMPARATIVE EXAMPLE 2

Figure 2:
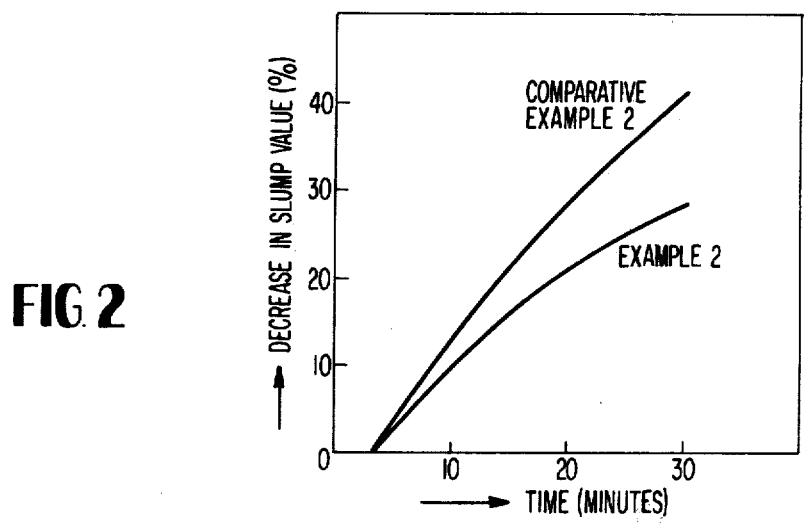
FIG. 2 shows the relationship between the decrease in slump value with the passage of time.

30 liters of the air-entraining water-reducing agent of Example 1.1 or Comparative Example 1.5 was added to concrete (Example 2 and Comparative Example 2, respectively), and the concrete was mixed for 3 minutes with an Irich type mixer. Immediately then, the slump value and the amount of entrained air were measured. Then, every 10 minutes from the stopping of mixing, the concrete was re-mixed for 3 minutes. Every time, the slump value and the amount of air entrained were measured. The degree of reduction in the slump value and the amount of air by the repetition of standing after mixing and re-mixing was examined. The results obtained are shown in FIG. 1 (the amount of air), and FIG. 2 (the slump value).

The concrete containing the air-entraining water-reducing agent of this invention has a low rate of decrease in the amount of air and slump, and far superior properties with regard to the stability of air bubbles in the concrete and the reduction of the slump loss of the uncured concrete. Thus it can be seen that the air-entraining water-reducing agents of this invention have a great effect in improving the workability of the concrete and the maintenance of this effect is excellent.

EXAMPLE 3 AND COMPARATIVE EXAMPLE 3

A mixture of the higher secondary alcohol oxyethylene sulfate shown in Example 1.7 or a sulfate of an adduct formed between a higher secondary alcohol mainly of 14 to 15 carbon atoms and 9 mols of ethylene oxide with the sodium resinate shown in Comparative Example 1.5 was used as an air-entraining water-reducing agent in each of Examples 3.1 to 3.8.

On the other hand, the higher secondary alcohol oxyethylene sulfate, sodium resinate and polyoxyethylene alkyl aryl ether (tradename, Chupol C, product of Takemoto Oil and Fats ) were used as air-entraining water-reducing agents in Comparative Examples 3.1 to 3.7.

The properties of the air-entraining water-reducing agents in these Examples and Comparative Examples were examined by the same method as described in Example 1 and Comparative Example 1 using the same concrete admixtures as in Example 1 and Comparative Example 1. The amount of entrapped air in the concrete, the ratio of water reduction, and the compression strength are shown in Table 2 below.

Table 2

| Example (Ex.) or Comparative Example (Comp.) | Air-entraining Water-reducing Agent | Proportion of Air-entraining Water-reducing Agent (wt.%) | Recipe for Concrete Formulation | | |
|---|---|---|---|---|---|
| | | | Cement (Kg/m$^3$) | Water (Kg/m$^3$) | Ratio of Fine Aggregate (%) |
| Ex. 3.1 | R\\CHO(CH$_2$CH$_2$O)$_3$SO$_3$Na + SR /R' | 0.0008+0.0028 | 300 | 158 | 35.5 |
| Ex. 3.2 | R\\CHO(CH$_2$CH$_2$O)$_6$SO$_3$Na + SR /R' | 0.001+0.003 | " | 157 | " |
| Comp. 3.1 | R\\CHO(CH$_2$CH$_2$O)$_3$SO$_3$Na /R' | 0.001 | " | 162 | " |
| Comp. 3.2 | Sodium resinate (SR) | 0.006 | " | 164 | " |
| Reference | Not added | 0 | " | 174 | 36.4 |
| Ex. 3.3 | R\\CHO(CH$_2$CH$_2$O)$_3$SO$_3$Na + SR /R' | 0.001+0.003 | 250 | 163 | 40.5 |
| Ex. 3.4 | R\\CHO(CH$_2$CH$_2$O)$_3$SO$_3$Na + SR /R' | 0.0008+0.0037 | " | 163 | " |
| Ex. 3.5 | R\\CHO(CH$_2$CH$_2$O)$_6$SO$_3$Na + SR /R' | 0.002+0.003 | " | 163 | " |
| Comp. 3.3 | R\\CHO(CH$_2$CH$_2$O)$_3$SO$_3$Na /R' | 0.002 | " | 167 | " |
| Comp. 3.4 | Sodium resinate (SR) | 0.005 | " | 167 | " |
| Comp. 3.5 | Polyoxyethylenealkylaryl ether | 0.03 | " | 162 | " |
| Reference | Not added | 0 | " | 178 | 42.5 |
| Ex. 3.6 | R\\CHO(CH$_2$CH$_2$O)$_3$SO$_3$Na + SR /R' | 0.0012+0.0038 | 300 | 165 | 38.6 |

Table 2-continued

| | | Amount of Entrapped Air | Ratio of Water Reduction | Compression Strength Ratio (%) | | |
|---|---|---|---|---|---|---|
| | Slump | | | 3 Days Old | 7 Days Old | 28 Days Old |

| Ex. 3.7 | R\\CHO(CH$_2$CH$_2$O)$_3$SO$_3$Na + SR /R' | 0.0016+0.0024 | " | 164 | " | |
| Ex. 3.8 | R\\CHO(CH$_2$CH$_2$O)$_3$SO$_3$Na + SR /R' | 0.0011+0.0049 | " | 165 | " | |
| Comp. 3.6 | R\\CHO(CH$_2$CH$_2$O)$_3$SO$_3$Na /R' | 0.0025 | " | 164 | " | |
| Comp. 3.7 | Sodium resinate (SR) | 0.005 | " | 170 | " | |
| Reference | Not added | 0 | " | 180 | 40.6 | |

| Example (Ex.) of Comparative Example (Comp.) | Slump (cm) | Amount of Entrapped Air (%) | Ratio of Water Reduction (%) | 3 Days Old | 7 Days Old | 28 Days Old |
|---|---|---|---|---|---|---|
| Ex. 3.1 | 7±1 | 4.5 | 9.2 | 124 | 115 | 109 |
| Ex. 3.2 | " | 4.3 | 9.8 | 124 | 119 | 112 |
| Comp. 3.1 | " | 4.4 | 6.9 | 122 | 111 | 105 |
| Comp. 3.2 | " | 4.5 | 5.7 | 102 | 101 | 98 |
| Reference | " | 1.8 | — | 100 | 100 | 100 |
| Ex. 3.3 | 18±1 | 4.4 | 8.4 | | 115 | 116 |
| Ex. 3.4 | " | 4.2 | 8.4 | | 116 | 114 |
| Ex. 3.5 | " | 4.6 | 8.4 | | 113 | 111 |
| Comp. 3.3 | " | 4.2 | 6.2 | | 110 | 106 |
| Comp. 3.4 | " | 4.3 | 6.2 | | 101 | 95 |
| Comp. 3.5 | " | 4.9 | 9.0 | | 106 | 101 |
| Reference | " | 1.7 | — | | 100 | 100 |
| Ex. 3.6 | " | 4.8 | 8.3 | | 114 | 109 |
| Ex. 3.7 | " | 4.4 | 8.9 | | 111 | 108 |
| Ex. 3.8 | " | 4.2 | 8.3 | | 112 | 108 |
| Comp. 3.6 | " | 4.4 | 8.9 | | 112 | 106 |
| Comp. 3.7 | " | 3.8 | 5.6 | | 100 | 94 |
| Reference | " | 1.7 | — | | 100 | 100 |

Note 1: R and R' represent alkyl groups, and the total number of carbon atoms of R and R' is 13 to 14.
Note 2: The amount of the air-entraining water-reducing agent was on the anhydrous basis.
Note 3: SR represents sodium rhodinate.

EXAMPLE 4 AND COMPARATIVE EXAMPLE 4

The economy of concrete containing the air-entraining water-reducing agent of this invention was examined.

Using ordinary portland cement, fine aggregate (river sand, specific gravity 2.61) and coarse aggregate (river gravel, specific gravity 2.67, maximum size 25 mm) as concrete mixing components, and each of the air-entraining water-reducing agents of Example 1.7 and Example 3.1, and a mixture of sodium resinate with an adduct formed between a higher secondary alcohol mainly of 14 to 15 carbon atoms and 2 mols of propylene oxide, concretes having a design standard strength (Kg/cm$^2$) of 180, 210 and 240 were designed on the basis of the data in Tables 1 and 2 in accordance with the mixing method shown in JAAS (Japanese Architectural Standard Specification)-5.

As comparisons, the same designing was performed using the above sodium resinate and the air-entraining water-reducing agent used in Comparative Example 3.5.

The properties of the air-entraining water-reducing agent of this invention meet the various standards for air-entraining water-reducing agents in Japan (for example, Proposed Standards for Admixtures-Civil Engineering Society of Japan, Proposed Standards for Admixtures-Japanese Association of Materials, and Proposed Standards for Admixtures-Japan Housing Corporation). The amount of the air-entraining water-reducing agent of this invention to be used is sufficiently about ¼ to 1/10 of that required of the conventional air-entraining water-reducing agents. When the concrete strength is assumed to be constant, the economic value is much better than that of the conventional air-entraining water-reducing agents.

When the mixing of concrete was performed on the basis of the data given in Table 3 using the air-entraining water-reducing agent of this invention, a concrete having much the same strength as the design standard strength was obtained.

Table 3

| Example (Ex.) or Comparative Example (Comp.) | Air-entraining Water-reducing Agent | Design Standard Strength (Kg/cm$^2$) |
|---|---|---|
| Ex. 4.1 | R\\CHO(CH$_2$CH$_2$O)$_3$SO$_3$Na /R' | 180<br>210<br>240<br>180 |

Table 3-continued

| Ex. 4.2 | R\\_CHO(CH$_2$CH$_2$O)$_3$SO$_3$Na + SR / R' | 210 |
| | | 240 |
| | | 180 |
| Ex. 4.3 | R\\_CHO(CH$_3$CHCH$_2$O)$_2$SO$_3$Na + SR / R' | 210 |
| | | 240 |
| | | 180 |
| Comp. 4.1 | Sodium resinate (SR) | 210 |
| | | 240 |
| | | 180 |
| Comp. 4.2 | Polyoxyethylene alkyl aryl ether | 210 |
| | | 240 |
| | | 180 |
| Reference | Not added | 210 |
| | | 240 |

| Example (Ex.) or Comparative Example (Comp.) | Mixing of Concrete | | | | Air-entraining Water-reducing Agent (g/m$^3$) |
| --- | --- | --- | --- | --- | --- |
| | Cement (Kg/m$^3$) | Water (Kg/m$^3$) | Sand (Kg/m$^3$) | Gravel (Kg/m$^3$) | |
| | 209 | 170 | 815 | 1102 | 3.1 |
| Ex. 4.1 | 231 | 169 | 809 | 1092 | 4.1 |
| | 251 | 167 | 785 | 1105 | 5.0 |
| | 174 | 162 | 895 | 1071 | 5.6 |
| Ex. 4.2 | 202 | 163 | 826 | 1116 | 6.4 |
| | 228 | 163 | 798 | 1122 | 9.1 |
| | 173 | 162 | 895 | 1072 | 7.0 |
| Ex. 4.3 | 200 | 162 | 827 | 1117 | 8.0 |
| | 226 | 163 | 799 | 1123 | 11.4 |
| | 224 | 165 | 816 | 1102 | 11.2 |
| Comp. 4.1 | 246 | 167 | 768 | 1127 | 12.4 |
| | 269 | 168 | 741 | 1132 | 13.4 |
| | 226 | 160 | 802 | 1128 | 67.8 |
| Comp. 4.2 | 243 | 161 | 776 | 1137 | 72.9 |
| | 262 | 163 | 767 | 1125 | 78.6 |
| | 248 | 180 | 824 | 1113 | 0 |
| Reference | 263 | 180 | 800 | 1125 | 0 |
| | 275 | 180 | 777 | 1139 | 0 |

Note 1: The blend ratio of the higher secondary alcohol oxyethylene (or oxypropylene) sulfate to the sodium resinate was 1:3.
Note 2: The amount of the air-entraining water-reducing agent added was calculated on an anhydrous basis.
Note 3: SR represents sodium resinate.

| | Proposed Standards for Admixtures, the Civil Engineering Society of Japan | |
| --- | --- | --- |
| | Air-entraining Agent | Water-reducing Agent |
| 1. Unit Amount of Water | Should be decreased | Less than 90% |
| 2. Amount of Bleeding | Less than 70% | Less than 70% |
| 3. Compression Strength | More than 85% at any age | More than 100% at 7 and 28 days old, and more than 90% at 6 months and one year old |
| 4. Flexural Strength | 85% at any age | More than 90% at 7 and 28 days old |
| 5. Adhesion Strength | More than 85% at age of 28 days | More than 95% at 28 days old |
| 6. Dry Shrinkage (percentage of length) | Less than 0.010 on drying for 28 days, 6 months and one year | Less than 0.010 on drying for 28 days, 6 months and one year |
| 7. Relative Durability Coefficient | More than 89% | More than 80% |

| Type of Concrete | | Proposed Standards for Admixtures, Japan Association of Materials | | |
| --- | --- | --- | --- | --- |
| | | Admixture A Type (AE agent) | Admixture B Type (water-reducing agent) | |
| | Item | | Class A | Class B |
| Standard Concrete | Type | Non-AE concrete | Non-AE concrete | |
| | Amount of cement (Kg/m$^3$) | 300 | 300 | |
| | Range of slump (cm) | 7.5±1.0 | 7.5±1.0 | |
| | Range of amount of air (%) | About 1.5 | About 1.5 entrapped air | |
| | Test conditions | | | |
| Concrete Containing Ad- | Unit amount of cement (Kg/m$^3$) | 300 | 300 | |
| | Range of slump (cm) | 7.5±1.0 | 7.5±1.0 | |

-continued

| Type of Concrete | Item | Proposed Standards for Admixtures, Japan Association of Materials | | |
|---|---|---|---|---|
| | | Admixture A Type (AE agent) | Admixture B Type (water-reducing agent) | |
| | | | Class A | Class B |
| mixtures | Range of the amount of air (%) | 4.5±0.5 | Less than 4.0 | |
| | (1) Maximum value of percent water reduction (%) | | Less than 90 | Less than 95 |
| Concrete Containing Admixtures | (2) Setting   start | Should not be unusual | ± 1 | |
| | (hour)   end | | ± 1 | |
| | (3) Rate of bleeding (%) | Less than 75 | Less than 75 | Less than 75 |
| | (4) Compression strength (%) | | | |
| | 3 days | | More than 115 | More than 105 |
| | 7 days | More than 90 | More than 110 | More than 100 |
| | 28 days | | More than 105 | More than 95 |
| Concrete Containing Admixtures | (5) Flexural strength (%) | | | |
| | 7 days | More than 90 | More than 100 | More than 100 |
| | 28 days | | More than 100 | More than 95 |
| | (6) Resistance to freezing and thawing (decrease (%)) | Below 25 | Below 25 | Below 30 |
| | (7) Drying shrinkage (6 months) | Below $1 \times 10^{-4}$ | Below $1 \times 10^{-4}$ | |

| | Proposed Standards for Admixtures, Japan Housing Corporation | | | |
|---|---|---|---|---|
| Type of Admixtures | | Type I | Type II | Type III |
| Type of Concrete | Standard Concrete | AE Agent | Water-reducing Agent | Standard AE Water-reducing Agent |
| Items | | | | |
| 1. Unit amount of cement (Kg/m³) | 300 | 300 | 280 | 280 |
| 2. Range of slump (cm) | 15±1 | 15±1 | 15±1 | 15±1 |
| | 18±1 | 18±1 | 18±1 | 18±1 |
| | 21±1 | 21±1 | 21±1 | 21±1 |
| 3. Range of the amount of air (%) | Below 1.5 | 4.0±0.5 | Below ±1.0 | 4.0±0.5 |
| 4. Rate of water reduction (%) | 0 | Above 5 | Above 4 | Above 10 |
| 5. Setting time   Start | — | ±1 | ±1 | ±1 |
| (hour)   End | — | ±1 | ±1 | ±1 |
| 6. Bleeding ratio | 100 | Below 75 | Below 95 | Below 75 |
| 7. Compression   3 days | 100 | Above 90 | Above 110 | Above 110 |
| Strength   7 days | 100 | Above 90 | Above 105 | Above 105 |
| 28 days | 100 | Above 90 | Above 100 | Above 100 |
| 8. Flexural Strength   7 days | 100 | Above 90 | Above 100 | Above 100 |
| 28 days | 100 | Above 90 | Above 95 | Above 95 |
| 9. Rate of reduction in the resistance to freezing and thawing (%) | — | Below 30 | — | Below 30 |
| 10. Change in length, shrinkage on drying | — | Below $10 \times 10^{-4}$ | Below $10 \times 10^{-4}$ | Below $10 \times 10^{-4}$ |

While the invention has been described in detail and with reference to specific embodiments thereof, it will be apparent to one skilled in the art that various changes and modifications can be made therein without departing from the spirit and scope thereof.

What is claimed is:

1. A cement composition comprising a cement and an air-entraining water-reducing agent for the cement, comprising as an active ingredient a higher secondary alcohol oxyalkylene sulfate of the following general formula

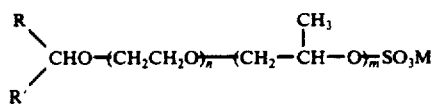

wherein R and R' are alkyl groups with the sum of the total number of carbon atoms of both R and R' being about 10 to 20; $n$ and $m$ are each an integer of from 0 to 15, with $n+m$ being 1 to 15, and M is an alkali metal atom, an ammonium group or an amine group.

2. The cement composition of claim 1, wherein said air-entraining water reducing agent comprises 1 to 5 parts by weight of an alkali metal salt of resin acid per part by weight of said higher secondary alcohol oxyalkylene sulfate.

3. The cement composition of claim 1, wherein the total number of carbon atoms in said R and R' ranges from 11 to 15.

4. The cement composition of claim 1, wherein said cement is a hydraulic cement.

5. The cement composition of claim 4, wherein said hydraulic cement is portland cement, blast furnace cement, alumina cement, silica cement, slag cement, a regulated set cement or a mixture thereof.

6. The cement composition of claim 1, wherein said higher secondary alcohol oxyalkylene sulfate is present in said cement composition in an amount of about 0.0003 to 0.2% by weight.

7. The cement composition of claim 6, wherein said amount is 0.0008 to 0.01% by weight.

* * * * *